(12) United States Patent
Qi et al.

(10) Patent No.: US 11,230,817 B2
(45) Date of Patent: Jan. 25, 2022

(54) RAINFALL INDUCTION TYPE TWO-COMPONENT HIGH-POLYMER GROUTING DEVICE AND MANUFACTURING METHOD THEREOF

(71) Applicants: Ningbo University, Ningbo (CN); Fujian Geological Engineering Survey Institute, Fuzhou (CN)

(72) Inventors: Changguang Qi, Ningbo (CN); Zhichao Zhang, Fuzhou (CN); Jinjing Pan, Ningbo (CN); Kan Liu, Fuzhou (CN); Longzhen Ye, Fuzhou (CN); You Gao, Ningbo (CN)

( * ) Notice: Subject to any disclaimer, the term of this patent is extended or adjusted under 35 U.S.C. 154(b) by 0 days.

(21) Appl. No.: 17/036,810

(22) Filed: Sep. 29, 2020

(65) Prior Publication Data
US 2021/0292986 A1    Sep. 23, 2021

(30) Foreign Application Priority Data

Mar. 19, 2020 (CN) .......................... 202010195346.7

(51) Int. Cl.
*E02D 3/12*   (2006.01)
*F16H 21/44*  (2006.01)
*G01W 1/14*   (2006.01)

(52) U.S. Cl.
CPC .............. *E02D 3/12* (2013.01); *F16H 21/44* (2013.01); *G01W 1/14* (2013.01);
(Continued)

(58) Field of Classification Search
CPC ...... E02D 3/12; E02D 2250/003; E02D 26/10; E02D 2300/0006; G01W 1/14; F16H 21/44
See application file for complete search history.

(56) References Cited

U.S. PATENT DOCUMENTS 5,181,797 A * 1/1993 Circeo, Jr ................. E02D 3/11
                                                    405/128.65
5,401,312 A * 3/1995 Hanst ....................... C04B 28/18
                                                    106/706
(Continued)

*Primary Examiner* — Benjamin F Fiorello

(57) ABSTRACT

The present invention discloses a rainfall sensing two-component high-polymer grouting device and a manufacturing method therefor, and belongs to the technical field of soil protection. The present invention includes an iron box and a water bucket. The water bucket is slidably fitted in the iron box. An inner bottom of the iron box is provided with a pair of lever upturning apparatuses symmetrically distributed about an axis center of the iron box. A lower surface of the iron box is provided with a curing agent ejector and a resin ejector. An end of two lever upturning apparatuses is slidably connected to a low surface of the water bucket. The switches of the curing agent ejector and the resin ejector are respectively connected to the other end of a lever upturning apparatus. A peripheral surface of the water bucket is provided with a permeable hole, and a permeable head is installed on the permeable hole. The present invention utilizes the lever principle of natural gravity and the spring-assisted method to realize the function of high-polymer grouting slope protection, and belongs to an ingenious mechanical structure apparatus. There is no need to stimulate and excite from the external energy, which is environmentally friendly and does not waste the resources and energy.

10 Claims, 9 Drawing Sheets

(52) U.S. Cl.
CPC .................. *E02D 2250/003* (2013.01); *E02D 2300/0006* (2013.01); *E02D 2600/10* (2013.01)

(56) References Cited

U.S. PATENT DOCUMENTS

| | | | | |
|---|---|---|---|---|
| 5,494,514 | A * | 2/1996 | Goodson | C04B 28/02 106/677 |
| 5,577,865 | A * | 11/1996 | Manrique | E02D 15/04 405/266 |
| 5,980,446 | A * | 11/1999 | Loomis | B09B 1/00 405/129.45 |
| 6,821,056 | B1 * | 11/2004 | Mansour | E02D 27/48 405/230 |
| 8,690,486 | B2 * | 4/2014 | Barron | E02D 3/12 405/266 |
| 8,844,240 | B2 * | 9/2014 | Kuchel | E02D 27/08 52/741.15 |
| 8,956,083 | B2 * | 2/2015 | Hakkinen | E02D 5/46 405/269 |
| 9,512,587 | B2 * | 12/2016 | Arima | E02D 3/12 |

\* cited by examiner

RAINFALL INDUCTION TYPE TWO-COMPONENT HIGH-POLYMER GROUTING DEVICE AND MANUFACTURING METHOD THEREOF

TECHNICAL FIELD

The present invention belongs to the technical field of soil protection, and particularly relates to a rainfall sensing two-component high-polymer grouting device and a manufacturing method therefor.

BACKGROUND ART

Landslides and mudslides are two very similar geological disasters, both of which are caused by heavy rains. Landslides are caused by heavy rains or continuous rainfall that overwhelm the mountain, disconnecting from weak areas of the mountain and causing the overall decline. Mudslides are caused by heavy rains or continuous rainfall that make the sands, soils, and rocks reaching the water-saturated state and reaching the liquefied state, so that under the action of gravity, the liquefied muds, sands, and rocks flow toward the low-lying places. All in all, landslides and mudslides are closely related to the invasion of soil by rains. At present, these two kinds of natural disasters occur frequently and have a great destructive power, causing serious losses of the lives and properties. There are mainly three traditional methods to prevent the landslides and mudslides:

(1) using supporting structures such as anchor rods, retaining walls, and pile foundations to reinforce the bearing capacity of the soil;

(2) setting up drainage ditches or drainage projects to prevent ground water from immersing into the soil, and taking the anti-seepage measures when necessary;

(3) planting the vegetation to consolidate the topsoil and reduce the probability and scale of the mudslides and landslides. No matter which method it is, it cannot be adjusted and adopted for slope protection in real time according to the amount of rainfall.

In view of the inseparable relationship between these two natural disasters and precipitation, traditional slope protection projects may not be able to decide whether to perform slope protection due to the uncertainty of precipitation, which causes many accidents. Or it may happen that all slope protection projects have been done for a slope body without landslides and mudslides, causing a lot of waste. In addition, the traditional slope protection projects have a long construction time and a high cost. The present invention mainly aims at the disadvantages that the traditional slope protection method cannot adjust whether to perform slope protection in real time according to the amount of rainfall, the construction period is long, and the cost is high. Using a rainfall sensing device, according to the amount of the rainfall, the switch is triggered by the break of the steel wire to spray (eject) the two-component high-polymer material. The rapid expansion of the two-component high-polymer material can strengthen the soil and prevent rainwater from penetrating into the soil, thereby effectively preventing the occurrence of the landslides and mudslides. Meanwhile, this device is of a simple manufacturing method, a low price of high-polymer and other materials, a fast construction speed with a short period, and has significant advantages in technology and cost. At present, the application of either the rainfall sensing device or the high-polymer material in slope protection projects is not common, especially the rainfall sensing trigger switch that does not need to rely on electricity is rare. Therefore, it is extremely necessary to make a rainfall sensing two-component high-polymer grouting device with both drainage function and soil reinforcement.

SUMMARY

The purpose of the present invention is to provide a rainfall sensing two-component high-polymer grouting device and a manufacturing method therefor. When the amount of rainfall exceeds a set value, the compound is automatically sprayed to form a high-polymer to the slope body to prevent the slope body from slipping.

In order to solve the above technical problems, the present invention is realized through the following technical solutions:

The present invention provides a rainfall sensing two-component high-polymer grouting device, comprising an iron box and a water bucket, wherein the water bucket is slidably fitted in the iron box; an inner bottom of the iron box is provided with a pair of lever upturning apparatuses symmetrically distributed about an axis center of the iron box; a lower surface of the iron box is provided with a curing agent ejector and a resin ejector; an end of the two lever upturning apparatuses is slidably connected to a low surface of the water bucket; switches of the curing agent ejector and the resin ejector are respectively connected to the other end of a lever upturning apparatus; a peripheral surface of the water bucket is provided with a permeable hole; and the iron box is equipped with a permeable head corresponding to the permeable hole.

Further, the lever upturning apparatus comprises a metal rod, a support foot arranged on an outer bottom surface of the water bucket, and a triangular rib arranged on an inner surface of the iron box, and wherein an end of the metal rod is jointed to the support foot, an non-end portion of the metal rod is equipped with a fulcrum shaft, the fulcrum shaft is fixed on the triangular rib, and an end of the metal rod is connected to the switch of the curing agent ejector or the switch of the resin ejector.

Further, the curing agent ejector comprises a curing agent ejection iron barrel, a curing agent storage iron barrel, a spring, a steel wire and a piston; the curing agent ejection iron barrel has an end cover and a switch base; the curing agent storage iron barrel is fixed in the curing agent ejection iron barrel; the curing agent storage iron barrel has an iron injection port and an iron ejection port extending out of an opening on a side wall of the curing agent ejection iron barrel; an end of the curing agent storage iron barrel is connected to the end cover, and the other end of the curing agent storage iron barrel is fitted with the piston; the other end of the piston is connected to a piston handle; a lower surface of the piston handle and the switch base are connected by a steel wire; an upper surface of the piston handle and the end cover are connected by at least two springs; and at least two steel wires are disposed on the upper surface of the piston handle, and the steel wires pass through a through hole provided on the end cover and is connected to an end of the metal rod.

Further, the end cover is an aluminum alloy cover having a through hole and a surface with a connection column; the piston handle has a connecting column; the two ends of the spring are respectively welded to the connection columns of the piston handle and the end cover; a circular ring is disposed on the lower surface of the piston handle; the circular ring is bolted with a steel wire; an end of the steel wire passes through a hole on the switch base and is clamped by a steel wire buckle fixed on the lower surface of the switch base.

Further, the resin ejector comprises a resin ejection iron barrel and a resin storage iron barrel; the installation of the resin storage iron barrel in the resin ejection iron barrel is the same as the installation of the curing agent storage iron barrel in the curing agent ejection iron barrel.

Further, the resin storage iron barrel is provided with an iron injection port and an iron ejection port that penetrate the resin storage iron barrel.

Further, a port of the iron injection port is fitted with a rubber cap, and the iron ejection port is covered with a rubber film.

Further, the curing agent ejection iron barrel is formed by threaded fitting the ends of an upper curing agent ejection iron barrel and a lower curing agent ejection iron barrel, and the resin storage iron barrel is formed by threaded fitting the ends of an upper resin storage iron barrel and a lower resin storage iron barrel.

A method for manufacturing a rainfall sensing two-component high-polymer grouting device is provided, comprising the following steps:

1). providing permeable heads on a upper side, and left and right sides of an iron box, and providing permeable holes on both sides of a water bucket;

2). welding a triangular rib at a bottom of the iron box and welding support feet at a bottom of the water bucket;

3). providing holes on both sides of a metal rod and a fulcrum shaft to connect by a bolt, wherein an end of the metal rod and the support feet are connected in an articulated manner, and an end of the fulcrum shaft is welded to an upper end portion of the triangular rib;

4). installing a curing agent ejector: welding an iron ejection port on an upper portion of a curing agent storage iron barrel, and welding an iron injection port in the middle of the curing agent storage iron barrel;

5). covering the iron ejection port with a rubber film, and covering the iron injection port with a rubber cap;

6). fixing a steel wire to a lower portion of the switch base by a steel wire buckle;

7). welding a circular ring on a lower surface of a piston shank and bolting the steel wire to the circular ring, welding an end of a piston shaft to an upper surface of the piston shank, and fixing the steel wire on the piston handle and the curing agent ejection iron barrel by an aluminum alloy cover; and 8). connecting a curing agent storage iron barrel and the piston shaft in a sliding fit, and fixing a spring, the piston handle, and the curing agent ejection iron barrel together by the aluminum alloy cover;

9). connecting an upper curing agent ejection iron barrel and a lower curing agent ejection iron barrel by a threaded sleeve to form the curing agent ejection iron barrel;

10). installing a resin ejector: welding an iron ejection port on an upper portion of the resin storage iron barrel, welding an iron injection port in a middle of the resin storage iron barrel, and installing the resin storage iron barrel in the resin ejection iron barrel to make the resin ejector;

11). installing the resin ejector by following steps 4)-9) for installing the curing agent ejector;

12). connecting the curing agent ejection iron barrel, the resin ejection iron barrel and the iron box together by a threaded connection to form the rainfall sensing two-component high-polymer grouting device.

Further, an upper portion of the curing agent storage iron barrel and the curing agent ejection iron barrel are fixed by a steel column, and an upper portion of the resin storage iron barrel and the resin ejection iron barrel are fixed by the steel column.

The present invention has the following beneficial effects:

(1) The present invention utilizes the lever principle of natural gravity and the spring-assisted method to realize the function of high-polymer grouting slope protection, and belongs to an ingenious mechanical structure apparatus. There is no need to stimulate and excite from the external energy, which is environmentally friendly and does not waste the resources and energy.

(2) The present invention can sense the amount of the rainfall. When the rainfall reaches a level and threatens the safety of the slope, the present invention will activate the grouting device to strengthen the slope.

(3) The grouting device formed by the present invention is simple and portable, easy to use directly, and has little damage to the existing soil structure, so its technical and economic advantages are more significant.

(4) The present invention makes full use of the characteristics of the non-aqueous reactive fast-expanding material of the two-component high-polymer. Once the two-component high-polymer is in contact, it will quickly react and expand violently. The formed expanding body has the characteristics of light weight, high strength, and imperviousness. It not only strengthens the soil, but also has good impermeability.

Of course, any product implementing the present invention does not necessarily need to achieve all the above-mentioned advantages at the same time.

BRIEF DESCRIPTION OF THE DRAWINGS

In order to more clearly illustrate the technical solutions of the embodiments of the present invention, the drawings required for the description of the embodiments will be briefly introduced below. Obviously, the drawings in the following description are only some embodiments of the present invention. For those of ordinary skill in the art, other drawings can be obtained based on these drawings without inventive labor.

Figure 1:
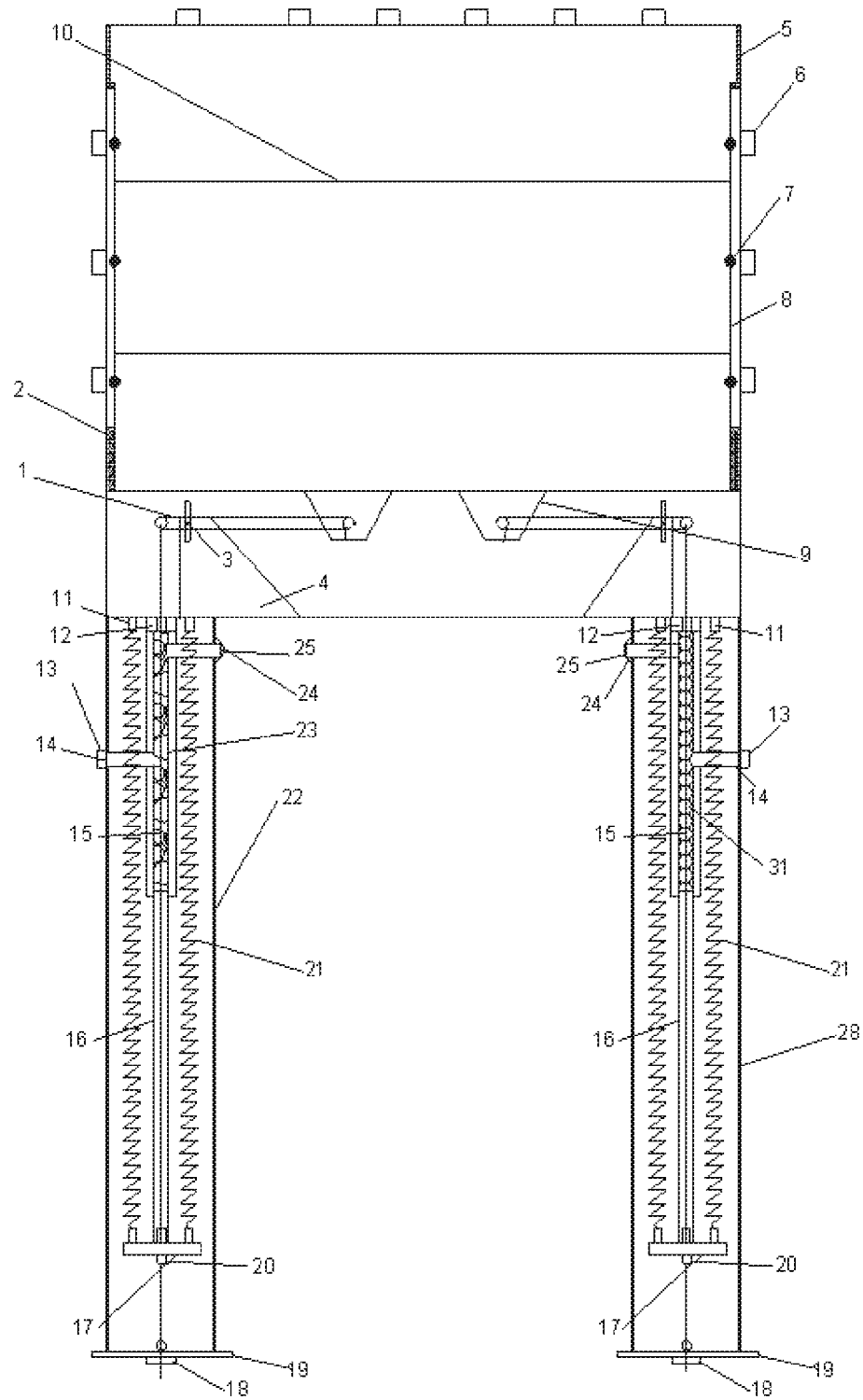
FIG. 1 is a schematic diagram of the high-polymer grouting device.
Figure 2:
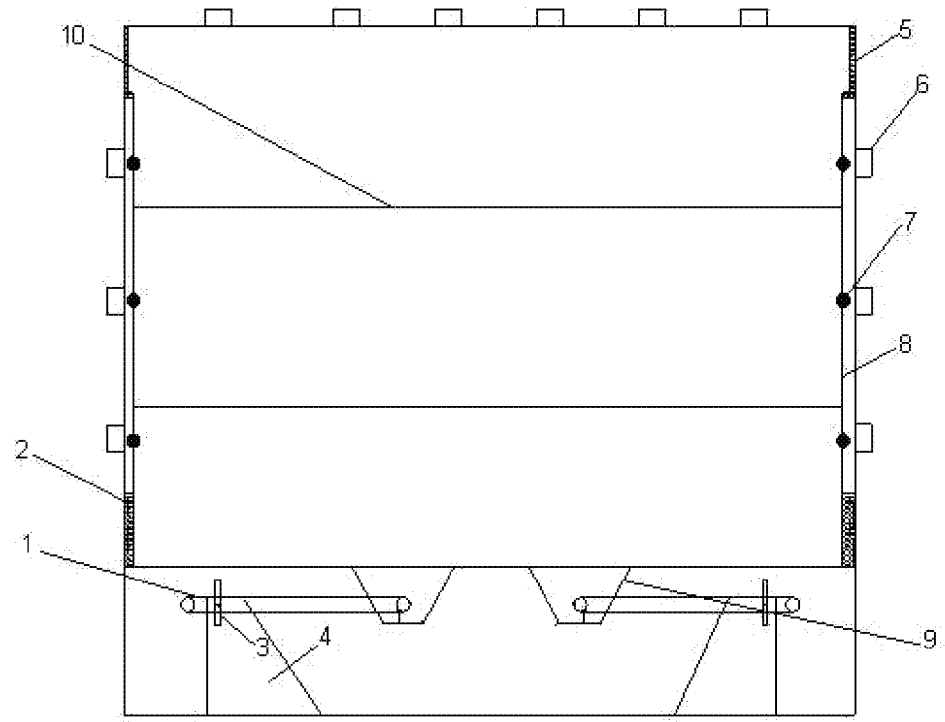
FIG. 2 is a schematic diagram of the rainfall sensing iron box.
Figure 3:
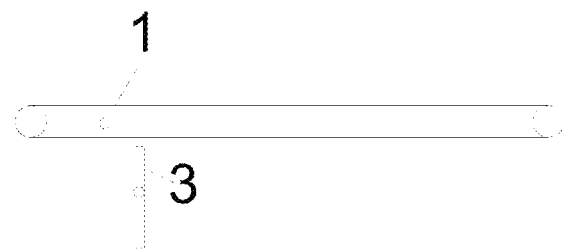
FIG. 3 is a schematic diagram of the lever apparatus in the iron box.
Figure 4:
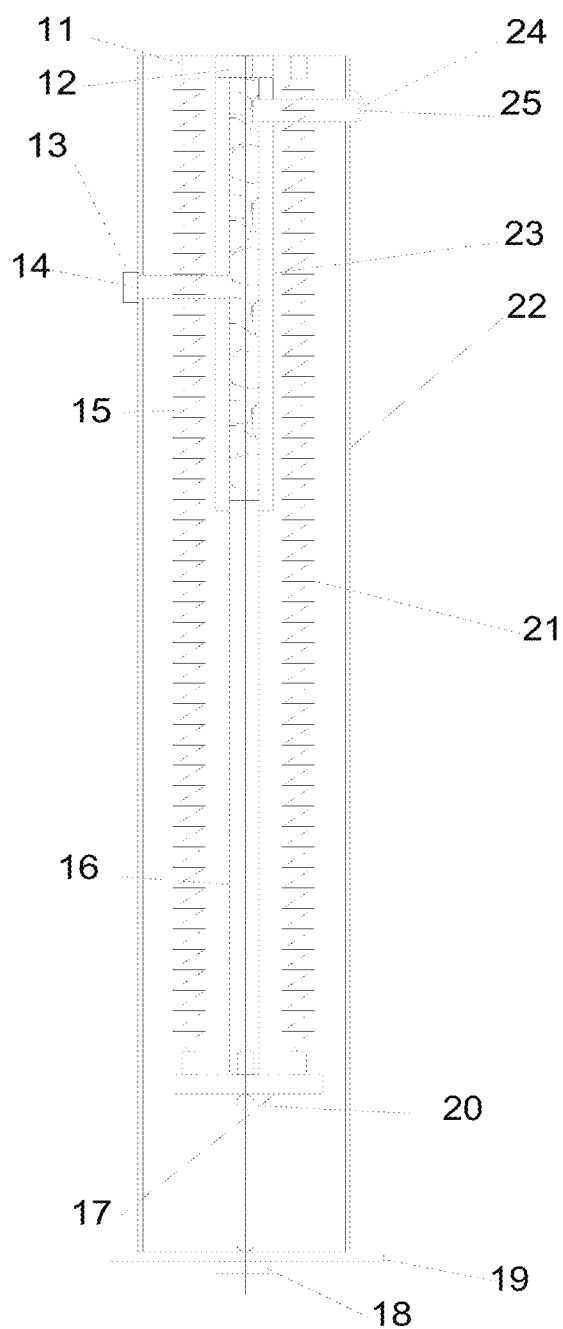
FIG. 4 is a schematic diagram of the curing agent ejection iron barrel.
Figure 5:
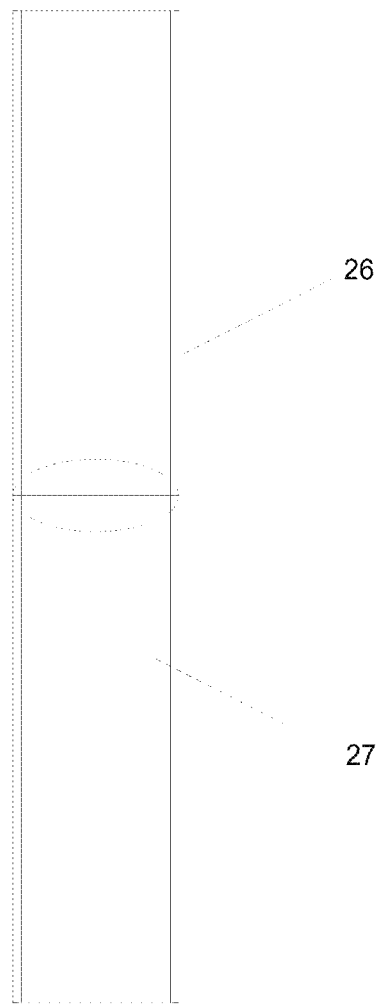
FIG. 5 is a schematic diagram of the connection of the upper and lower curing agent ejection iron barrels.
Figure 6:
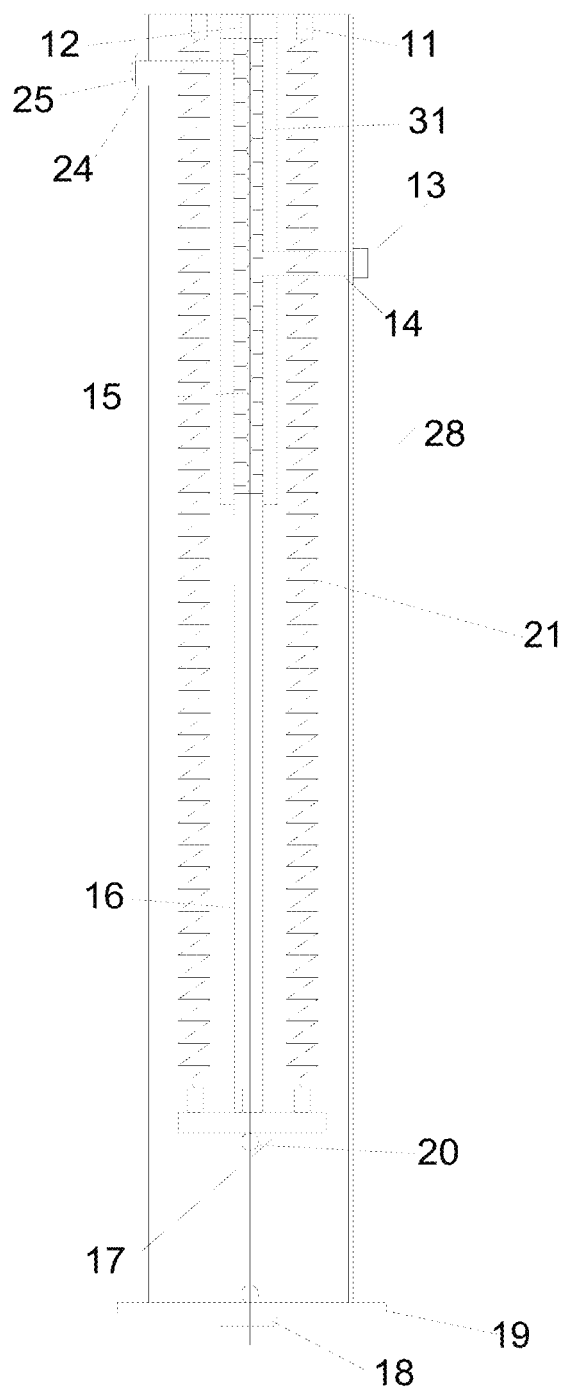
FIG. 6 is a schematic diagram of the resin ejection iron barrel.
Figure 7:
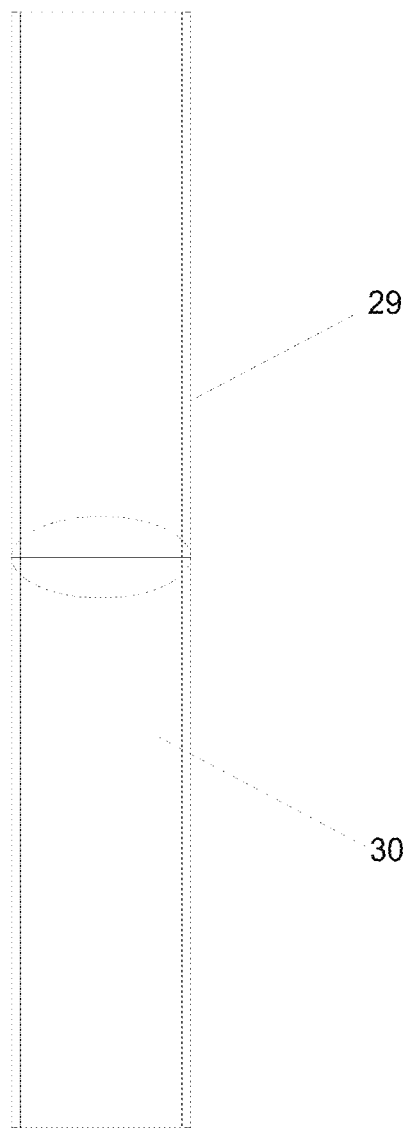
FIG. 7 is a schematic diagram of the connection of the upper and lower resin ejection iron barrels.
Figure 8:
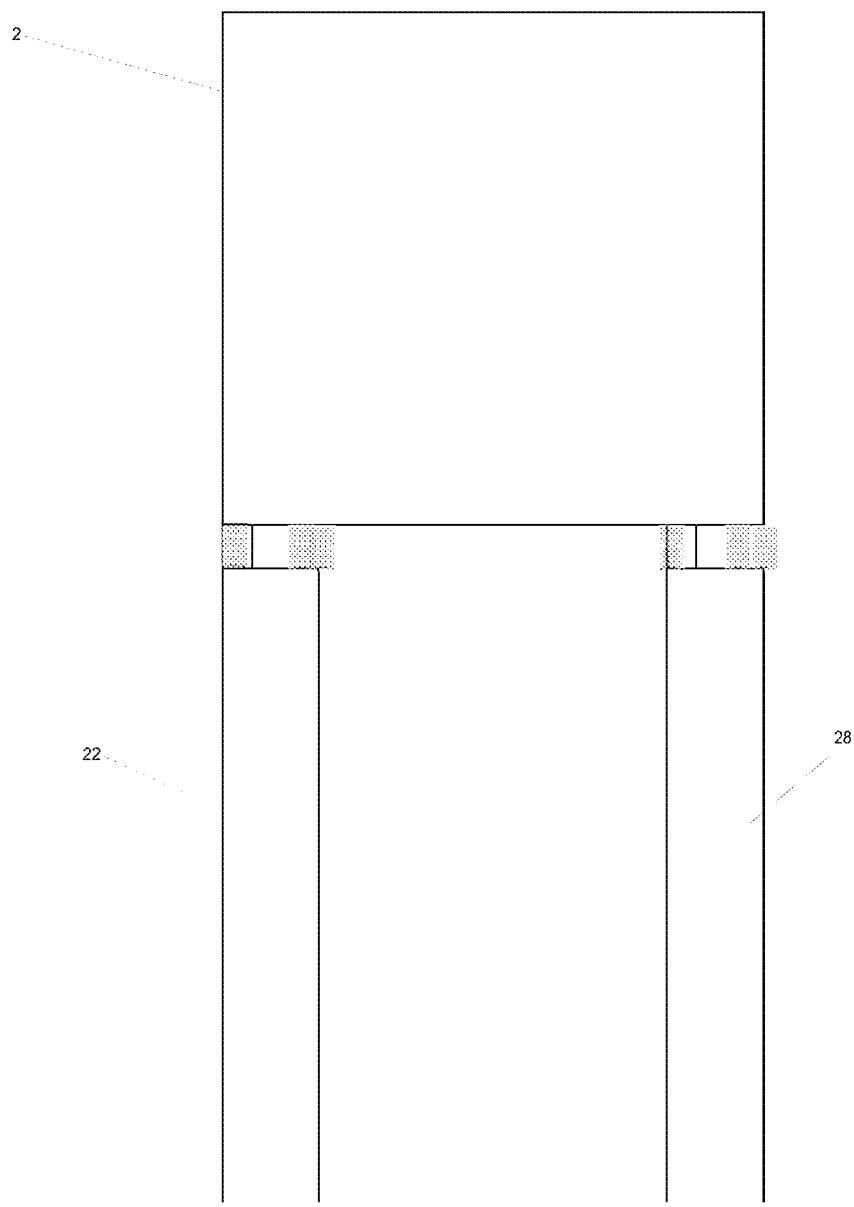
FIG. 8 is an assembly schematic diagram of the rainfall sensing two-component high-polymer grouting device.

In the drawings, the list of parts represented by each reference number is as follows:

1—metal rod, 2—iron box, 3—fulcrum shaft, 4—triangular rib, 5—rubber water-stop circular ring, 6—permeable head, 7—permeable hole, 8—water bucket, 9—support foot, 10—accumulated water, 11—aluminum alloy cover, 12—steel column, 13—rubber cap, 14—iron ejection port, 15—steel wire, 16—piston, 17—piston handle, 18—steel wire buckle, 19—switch base, 20—circular ring, 21—spring, 22—curing agent ejection iron barrel, 23—curing agent storage iron barrel, 24—rubber film, 25—iron ejection port, 26—upper curing agent ejection iron barrel, 27—lower curing agent ejection iron barrel, 28—resin ejection iron barrel, 29—upper resin ejection iron barrel, 30—lower resin ejection iron barrel, 31—resin storage iron barrel, 32—soil pit.

DETAIL DESCRIPTION OF THE EMBODIMENTS

The technical solutions in the embodiments of the present invention will be described hereinafter clearly and completely with reference to the attached drawings in the embodiments of the present invention. Apparently, the embodiments described herein are only portions of embodiments of the present invention, rather than all embodiments of the invention. It is intended that all other embodiments obtained by those skilled in the art according to the embodiments in the present invention without inventive labor are within the scope of the present invention.

In the description of the present invention, it is to be noted that the terms of "opening", "upper", "lower", "thickness", "top", "middle", "length", "inner", "around" and the like simply indicate orientational or positional relationship and are used only for the purpose of facilitating and simplifying the description of the invention, rather than specifying or implying that any assembly or elements indicated must have a certain orientation, constitute and operate with a certain orientation. Therefore, these terms will not be interpreted as limiting the present invention.

Please refer to FIGS. 1-12, the present invention provides a rainfall sensing two-component high-polymer grouting device, comprising an iron box 2 and a water bucket 8, wherein the water bucket 8 is slidably fitted in the iron box 2. The peripheral surface of the water bucket 8 is provided with a permeable hole 7, and the iron box 2 is equipped with a permeable head 6 corresponding to the permeable hole 7.

Specifically, the permeable head 6 is a small water hole, the purpose of which is to make the water in the soil enter the iron box 2. When it rains, the rainwater enters the water bucket 8 from the permeable hole 7, wherein a rubber water-stop ring 5 can be laid on the outer surface of the water bucket 8. The rubber water-stop ring 5 is attached to the inner surface of the water bucket 8 to prevent water from infiltrating to affect the bottom of the iron box 2, causing the corrosion of the apparatuses installed at the bottom of the iron box 2. The bottom surface of the iron box 2 has a through hole for the steel wire 15 to pass through.

Specifically, an inner bottom of the iron box 2 is provided with a pair of lever upturning apparatuses symmetrically distributed about an axis center of the iron box 2, and a lower surface of the iron box 2 is provided with a curing agent ejector and a resin ejector. An end of the two lever upturning apparatuses is slidably connected to a low surface of the water bucket 8, and the switches of the curing agent ejector and the resin ejector are respectively connected to the other end of a lever upturning apparatus. In an initial state, that is, in the state where the total weights of the water bucket 8 and the accumulated water in the water bucket 8 in the rain press on the upturning apparatuses, when the weights reaches the set weights of the lever upturning apparatuses, the curing agent ejector and the resin ejector are opened, thus forming a high-polymer grouting slope protection from the ejections.

Specifically, the lever upturning apparatus comprises a metal rod 1, a support foot 9 arranged on an outer bottom surface of the water bucket 8, and a triangular rib 4 arranged on an inner surface of the iron box 2, wherein an end of the metal rod 1 is jointed to the support foot 9, an non-end portion of the metal rod 1 is equipped with a fulcrum shaft 3, the fulcrum shaft 3 is fixed on the triangular rib 4, and an end of the metal rod 1 is connected to the switch of the curing agent ejector or the switch of the resin ejector. That is, the weights of the water bucket 8 and the accumulated water 10 are pressed on one end of the metal rod 1, so that the other end is upturned to control the curing agent ejector and the resin ejector.

Figure 9:
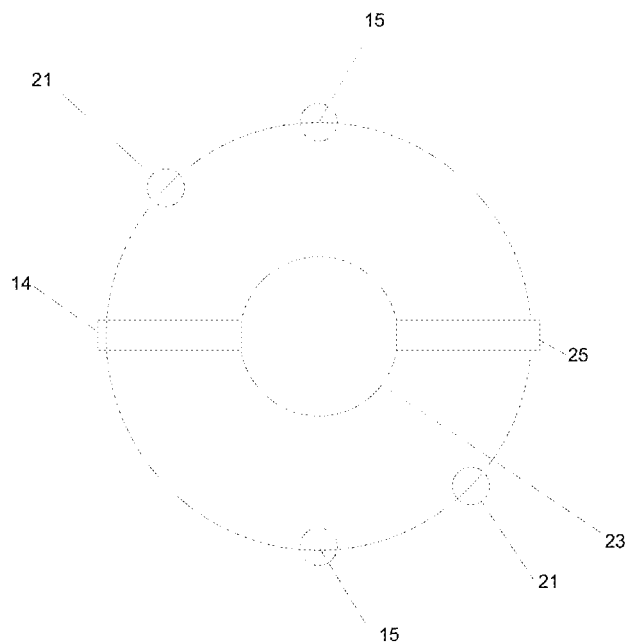
FIG. 9 is a schematic top view of the curing agent ejection iron barrel.
Figure 10:
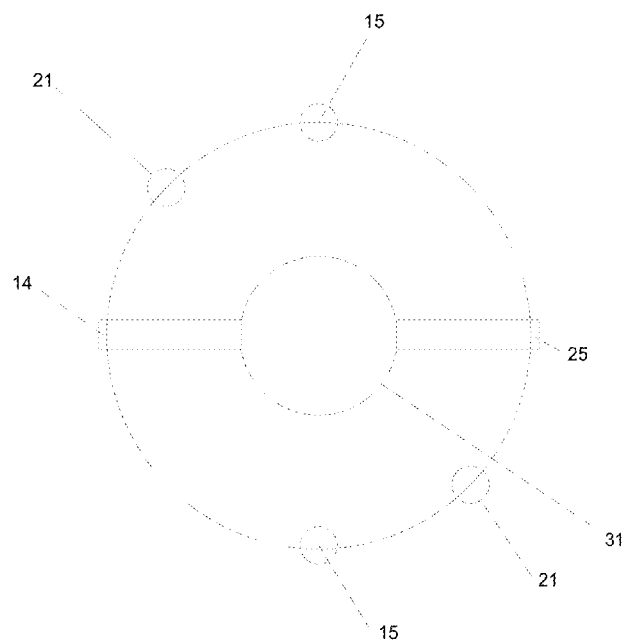
FIG. 10 is a schematic top view of a resin ejection iron barrel.
Figure 11:
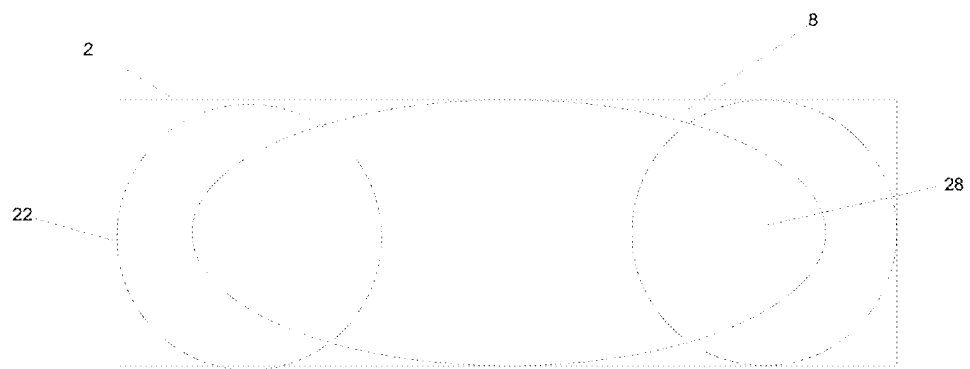
FIG. 11 is a schematic top view of the rainfall sensing two-component high-polymer grouting device.

The curing agent ejector comprises a curing agent ejection iron barrel 22, a curing agent storage iron barrel 23, a spring 21, a steel wire 15 and a piston 16; and the curing agent ejection iron barrel 22 has an end cover and a switch base 19; wherein the end cover is an aluminum alloy cover 11 having a through hole and a surface with a connection column. The curing agent storage iron barrel 23 is fixed in the curing agent ejection iron barrel 22. Specifically, the piston handle 17 has a connecting column. The two ends of the spring are respectively welded to the connection columns of the piston handle 17 and the end cover, and a circular ring 20 is disposed on the lower surface of the piston handle 17. The circular ring 20 is bolted with a steel wire 15. An end of the steel wire passes through a hole on the switch base 19 and is clamped by a steel wire buckle 18 fixed on the lower surface of the switch base 19. Specifically, as shown in FIG. 9, a pair of steel wires are arranged in the space between the piston handle 17 and the end cover and are symmetrical with respect to the curing agent storage iron barrel 23 in the position, wherein preferably, the fulcrum shaft 3 is installed on the metal rod 1 near ⅙ of the end of the steel wire.

The curing agent storage iron barrel 23 has an iron injection port 14 and an iron ejection port 25 extending out of an opening on a side wall of the curing agent ejection iron barrel 22. An end of the curing agent storage iron barrel 23 is connected to the end cover, and the other end of the curing agent storage iron barrel is fitted with the piston 16. The other end of the piston 16 is connected to a piston handle 17. A lower surface of the piston handle 17 and the switch base 19 are connected by the steel wire 15. An upper surface of the piston handle 17 and the end cover are connected by at least two springs 21. At least two steel wires 15 are disposed on the upper surface of the piston handle 17, and the steel wires 15 pass through a through hole provided on the end cover and is connected to an end of the metal rod 1. A single steel wire is arranged in the space between the piston handle 17 and the switch base 19, and the breaking force of the single steel wire is smaller than the breaking force of the other two steel wires.

The resin ejector comprises a resin ejection iron barrel 28 and a resin storage iron barrel 31. The installation of the resin storage iron barrel 31 in the resin ejection iron barrel 28 is the same as the installation of the curing agent storage iron barrel 23 in the curing agent ejection iron barrel 22. The structures of the resin ejector and the curing agent ejector are the same, the ejection methods are the same, and the objects ejected from the resin ejector and the curing agent ejector are different.

In addition, the resin storage iron barrel 31 is provided with an iron injection port 14 and an iron ejection port 25 that penetrate the resin storage iron barrel 31. A port of the iron injection port 14 is fitted with a rubber cap 13, and the iron ejection port 25 is covered with a rubber film 24.

The curing agent ejection iron barrel 22 is formed by threaded fitting the ends of an upper curing agent ejection iron barrel 26 and a lower curing agent ejection iron barrel 27, and the resin storage iron barrel 31 is formed by threaded fitting the ends of an upper resin storage iron barrel 29 and a lower resin storage iron barrel 30.

Figure 12:
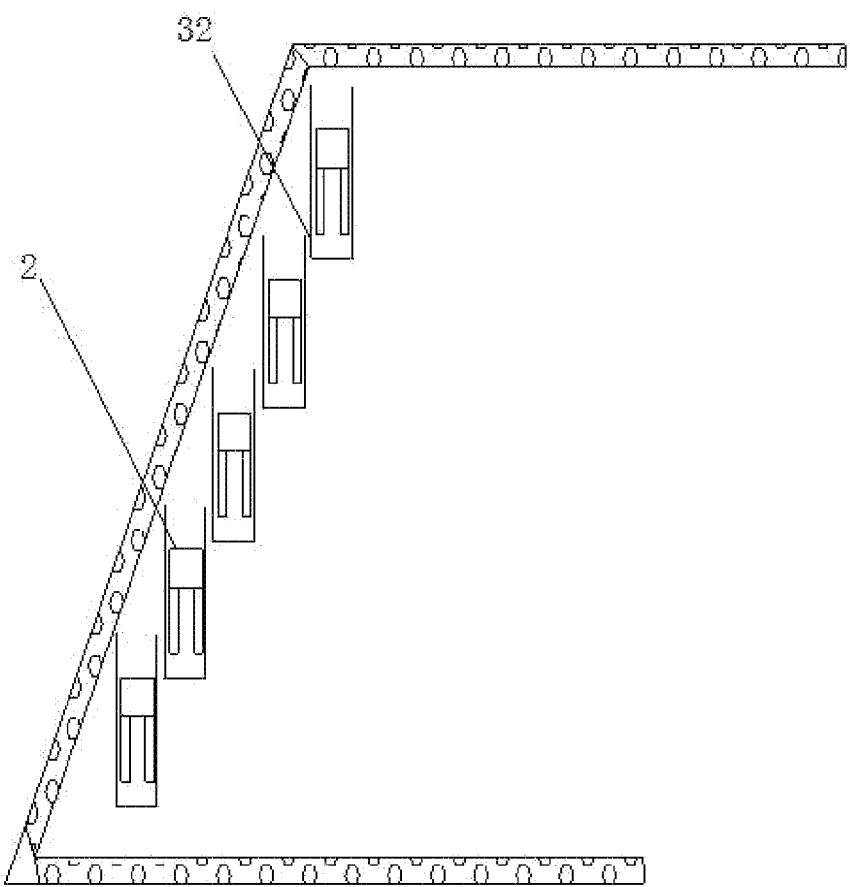
FIG. 12 is a schematic diagram of the actual application of the rainfall sensing two-component high-polymer grouting device in the slope protection.

Specifically, as shown in FIG. 12, provided is the specific application of the rainfall sensing two-component high-polymer grouting device in slope protection projects. This invention is suitable for slopes with a slope less than 60°. A corresponding soil pit 32 is firstly dug in the slope, then a grouting device is buried in the soil pit, and then the continues rains are waited to fill the water bucket 8 to a certain level to trigger a rainfall sensing lever apparatus, that is, the weights of the water bucket 8 and the accumulated water 10 cause the steel wire 15 between the piston handle 17 and the switch base 19 to be broken, thereby ejecting the resins and curing agents, thus the resins and curing agents react quickly to form high-polymer. Finally, the soil is reinforced and the rainwater is blocked by the properties and advantages of high-polymer, thereby reducing the probability of the mudslides and landslides.

A method for manufacturing a rainfall sensing two-component high-polymer grouting device is provided, comprising the following steps:

1). providing permeable heads 6 on a upper side, and left and right sides of an iron box 2, and providing permeable holes 7 on both sides of a water bucket 8;

2). welding a triangular rib 4 at a bottom of the iron box 2, and welding support feet 9 at a bottom of the water bucket 8;

3). providing holes on both sides of a metal rod 1 and a fulcrum shaft 3 to connect by a bolt, that is, a screw hole is disposed on the metal rod 1 and fulcrum shaft 3 which are installed together by the bolt, wherein the top ends of the metal rod 1 and the support feet 9 are connected in an articulated manner, and the fulcrum shaft 3 is fixed to the triangular rib 4;

4). welding an iron ejection port 25 on an upper portion of a curing agent storage iron barrel 23, and welding an iron injection port 14 in the middle of the curing agent storage iron barrel;

5). covering the iron ejection port 25 with a rubber film 24, and covering the iron injection port 14 with a rubber cap 13;

6). fixing a steel wire 15 to a lower portion of the switch base 19 by a steel wire buckle 18;

7). welding a circular ring 20 on a lower surface of a piston shank 17 and bolting the steel wire 15 on the circular ring, welding an end of a piston shaft 16 to an upper surface of the piston shank 17, and fixing the steel wire 15 on the piston handle 17 and the curing agent ejection iron barrel 22 by an aluminum alloy cover 11;

8). connecting a curing agent storage iron barrel 23 and the piston shaft 16 in a sliding fit, and fixing a spring 21, the piston handle 17, and the curing agent ejection iron barrel 22 together by the aluminum alloy cover 11;

9). connecting an upper curing agent ejection iron barrel 26 and a lower curing agent ejection iron barrel 27 by a threaded sleeve to form the curing agent ejection iron barrel 22;

10). welding an iron ejection port 25 on an upper portion of the resin storage iron barrel 31 and welding an iron injection port 14 in a middle of the resin storage iron barrel;

installing the resin ejector by following steps 4)-9) for installing the curing agent ejector, and the corresponding steps are detailed as steps 11)-15):

11). covering the iron ejection port 25 with a rubber film 24, and covering the iron injection port 14 with a rubber cap 13;

12). fixing the steel wire 15 to the lower portion of the switch base 19 by the steel wire buckle 18;

13). welding the circular ring 20 on the lower surface of the piston shank 17 and bolting the steel wire 15 to the circular ring, welding the end of the piston shaft 16 to the upper surface of the piston shank 17, and fixing the steel wire 15 on the piston handle 17 and the curing agent ejection iron barrel 22 by the aluminum alloy cover 11;

14). connecting a resin storage iron barrel 31 and the piston shaft 16 in a sliding fit, and fixing the spring 21, the piston handle 17, and the resin ejection iron barrel 28 together by the aluminum alloy cover 11;

15). connecting an upper resin ejection iron barrel 29 and a lower resin ejection iron barrel 30 by the threaded sleeve to form the resin ejection iron barrel 28;

16). connecting the curing agent ejection iron barrel 22, the resin ejection iron barrel 28 and the iron box 2 together by a threaded connection to form the rainfall sensing two-component high-polymer grouting device, that is, fixing the end cover on the bottom surface of the iron box 2 with the bolt.

In the description of this specification, the description with reference to the terms "one embodiment", "example", "specific example", etc. means that the specific feature, structure, material or characteristic described in combination with the embodiment or example is included in at least one embodiment or example of the present invention. In this specification, the schematic representations of the aforementioned terms do not necessarily refer to the same embodiment or example. Moreover, the described specific features, structures, materials or characteristics can be combined in any one or more embodiments or examples in a suitable manner. The preferred embodiments of the present invention disclosed above are only used to help explain the present invention. The preferred embodiment does not describe all the details in detail, nor does it limit the invention to only the described specific embodiments. Obviously, many modifications and changes can be made according to the contents of this specification. This specification selects and specifically describes these embodiments in order to better explain the principles and practical applications of the present invention, so that those skilled in the art can understand and use the present invention well. The present invention is only limited by the claims and their full scope and equivalents.

The invention claimed is:

1. A rainfall sensing two-component high-polymer grouting device, comprising an iron box and a water bucket, wherein the water bucket is slidably fitted in the iron box; an inner bottom of the iron box is provided with a pair of lever upturning apparatuses symmetrically distributed about an axis center of the iron box; a lower surface of the iron box is provided with a curing agent ejector and a resin ejector; an end of the two lever upturning apparatuses is slidably connected to a low surface of the water bucket; switches of the curing agent ejector and the resin ejector are respectively connected to the other end of a lever upturning apparatus; a peripheral surface of the water bucket is provided with a permeable hole; and the iron box is equipped with a permeable head corresponding to the permeable hole.

2. The rainfall sensing two-component high-polymer grouting device according to claim 1, wherein, the lever upturning apparatus comprises a metal rod, a support foot arranged on an outer bottom surface of the water bucket, and a triangular rib arranged on an inner surface of the iron box, and wherein an end of the metal rod is jointed to the support foot, an non-end portion of the metal rod is equipped with a fulcrum shaft, the fulcrum shaft is fixed on the triangular rib, and an end of the metal rod is connected to the switch of the curing agent ejector or the switch of the resin ejector.

3. The rainfall sensing two-component high-polymer grouting device according to claim 2, wherein, the curing agent ejector comprises a curing agent ejection iron barrel, a curing agent storage iron barrel, a spring, a steel wire and a piston; the curing agent ejection iron barrel has an end cover and a switch base; the curing agent storage iron barrel is fixed in the curing agent ejection iron barrel; the curing agent storage iron barrel has an iron injection port and an iron ejection port extending out of an opening on a side wall of the curing agent ejection iron barrel; an end of the curing agent storage iron barrel is connected to the end cover, and the other end of the curing agent storage iron barrel is fitted with the piston; the other end of the piston is connected to a piston handle; a lower surface of the piston handle and the switch base are connected by a steel wire; an upper surface of the piston handle and the end cover are connected by at least two springs; and at least two steel wires are disposed on the upper surface of the piston handle, and the steel wires pass through a through hole provided on the end cover and is connected to an end of the metal rod.

4. The rainfall sensing two-component high-polymer grouting device according to claim 3, wherein, the end cover is an aluminum alloy cover having a through hole and a surface with a connection column; the piston handle has a connecting column; the two ends of the spring are respectively welded to the connection columns of the piston handle and the end cover; a circular ring is disposed on the lower surface of the piston handle; the circular ring is bolted with a steel wire; an end of the steel wire passes through a hole on the switch base and is clamped by a steel wire buckle fixed on the lower surface of the switch base.

5. The rainfall sensing two-component high-polymer grouting device according to claim 4, wherein, the resin ejector comprises a resin ejection iron barrel and a resin storage iron barrel; the installation of the resin storage iron barrel in the resin ejection iron barrel is the same as the installation of the curing agent storage iron barrel in the curing agent ejection iron barrel.

6. The rainfall sensing two-component high-polymer grouting device according to claim 5, wherein, the resin storage iron barrel is provided with an iron injection port and an iron ejection port that penetrate the resin storage iron barrel.

7. The rainfall sensing two-component high-polymer grouting device according to claim 5, wherein, the curing agent ejection iron barrel is formed by threaded fitting the ends of an upper curing agent ejection iron barrel and a lower curing agent ejection iron barrel, and the resin storage iron barrel is formed by threaded fitting the ends of an upper resin storage iron barrel and a lower resin storage iron barrel.

8. The rainfall sensing two-component high-polymer grouting device according to claim 2, wherein, a port of the iron injection port is fitted with a rubber cap, and the iron ejection port is covered with a rubber film.

9. A method for manufacturing a rainfall sensing two-component high-polymer grouting device, comprising the following steps:
1). providing permeable heads on a upper side, and left and right sides of an iron box, and providing permeable holes on both sides of a water bucket;
2). welding a triangular rib at a bottom of the iron box, and welding support feet at a bottom of the water bucket;
3). providing holes on both sides of a metal rod and a fulcrum shaft to connect by a bolt, wherein an end of the metal rod and the support feet are connected in an articulated manner, and an end of the fulcrum shaft is welded to an upper end portion of the triangular rib;
4). installing a curing agent ejector: welding an iron ejection port on an upper portion of a curing agent storage iron barrel, and welding an iron injection port in the middle of the curing agent storage iron barrel;
5). covering the iron ejection port with a rubber film, and covering the iron injection port with a rubber cap;
6). fixing a steel wire to a lower portion of the switch base by a steel wire buckle;
7). welding a circular ring on a lower surface of a piston shank and bolting the steel wire to the circular ring, welding an end of a piston shaft to an upper surface of the piston shank, and
fixing the steel wire on the piston handle and the curing agent ejection iron barrel by an aluminum alloy cover;
8). connecting a curing agent storage iron barrel and the piston shaft in a sliding fit, and
fixing a spring, the piston handle, and the curing agent ejection iron barrel together by the aluminum alloy cover;
9). connecting an upper curing agent ejection iron barrel and a lower curing agent ejection iron barrel by a threaded sleeve to form the curing agent ejection iron barrel;
10). installing a resin ejector: welding an iron ejection port on an upper portion of the resin storage iron barrel, welding an iron injection port in a middle of the resin storage iron barrel, and installing the resin storage iron barrel in the resin ejection iron barrel to make the resin ejector;
11). installing the resin ejector by following steps 4)-9) for installing the curing agent ejector;
12). connecting the curing agent ejection iron barrel, the resin ejection iron barrel and the iron box together by a threaded connection to form the rainfall sensing two-component high-polymer grouting device.

10. The method for manufacturing a rainfall sensing two-component high-polymer grouting device according to claim 9, wherein, an upper portion of the curing agent storage iron barrel and the curing agent ejection iron barrel are fixed by a steel column, and an upper portion of the resin storage iron barrel and the resin ejection iron barrel are fixed by the steel column.

* * * * *